US010131801B2

(12) United States Patent
Czudaj et al.

(10) Patent No.: US 10,131,801 B2
(45) Date of Patent: Nov. 20, 2018

(54) VARNISH HAVING A MICROSTRUCTURE

(71) Applicant: ACTEGA TERRA GMBH, Lehrte (DE)

(72) Inventors: Violetta Czudaj, Burgdorf (DE); Frank Kamphuis, Neustadt a. Rbge. (DE); Martin Köhler, Hannover (DE); Uta Melzer, Isernhagen (DE)

(73) Assignee: ACTEGA TERRA GMBH, Lehrte (DE)

( * ) Notice: Subject to any disclaimer, the term of this patent is extended or adjusted under 35 U.S.C. 154(b) by 0 days.

(21) Appl. No.: 14/760,908

(22) PCT Filed: Jan. 10, 2014

(86) PCT No.: PCT/EP2014/050359
§ 371 (c)(1),
(2) Date: Jul. 14, 2015

(87) PCT Pub. No.: WO2014/108491
PCT Pub. Date: Jul. 17, 2014

(65) Prior Publication Data
US 2015/0353755 A1    Dec. 10, 2015

(30) Foreign Application Priority Data
Jan. 14, 2013   (EP) .................... 13151210

(51) Int. Cl.
*C09D 125/14*   (2006.01)
*C09D 5/28*   (2006.01)
(Continued)

(52) U.S. Cl.
CPC ................ *C09D 5/28* (2013.01); *C09D 7/65* (2018.01); *C09D 125/14* (2013.01);
(Continued)

(58) Field of Classification Search
CPC ........ C09D 125/14; C09D 7/125; C09D 5/28; C09D 133/10; C09D 7/65; D21H 19/68;
(Continued)

(56) References Cited

U.S. PATENT DOCUMENTS

2006/0063871 A1*  3/2006  Taylor .................. C08K 3/0016
524/300
2011/0237736 A1   9/2011  Roller et al.

FOREIGN PATENT DOCUMENTS

CN   102732103 A   10/2012
EP   0 543 385 A1   5/1993
(Continued)

OTHER PUBLICATIONS

EP 1593920 A2 (2005), machine translation, Google Patents.*
(Continued)

*Primary Examiner* — Josephine L Chang
(74) *Attorney, Agent, or Firm* — Grüneberg and Myers PLLC

(57) ABSTRACT

The present invention relates to a waterborne paint composition, comprising a non-film-forming poly(styrene acrylate) having a glass transition temperature ($T_G$) of at least 80° C., a poly(styrene acrylate) resin having a weight average molecular weight ($M_W$) of up to 20 000 g/mol, and water. Such a paint composition is suitable as an overprint varnish or primer for substrates such as paper, paperboard and sheets. Due to its surface structure having micro-cracks the applied paint film can advantageously be printed by inkjet printing.

17 Claims, 5 Drawing Sheets

(51) Int. Cl.
    *D21H 17/37* (2006.01)
    *D21H 17/60* (2006.01)
    *D21H 17/00* (2006.01)
    *D21H 19/66* (2006.01)
    *D21H 19/68* (2006.01)
    *C09D 133/10* (2006.01)
    *C09D 7/65* (2018.01)
    *B41M 5/52* (2006.01)

(52) U.S. Cl.
    CPC ............ *C09D 133/10* (2013.01); *D21H 17/37* (2013.01); *D21H 17/60* (2013.01); *D21H 17/72* (2013.01); *D21H 17/74* (2013.01); *D21H 19/66* (2013.01); *D21H 19/68* (2013.01); *B41M 5/5254* (2013.01); *C08L 2201/54* (2013.01); *C08L 2205/02* (2013.01)

(58) Field of Classification Search
    CPC ........ D21H 19/66; D21H 17/37; D21H 17/60; D21H 17/72; D21H 17/74; C08L 23/06; C08L 33/10; C08L 2205/02; C08L 2201/54; B41M 5/5254
    USPC ......................................................... 524/523
    See application file for complete search history.

(56) References Cited

FOREIGN PATENT DOCUMENTS

| | | | | |
|---|---|---|---|---|
| EP | 1593920 A2 | * | 11/2005 | ............ F26B 3/283 |
| JP | 58080365 A | * | 5/1983 | |
| JP | 2004-204050 A | | 7/2004 | |
| WO | WO 2011/093896 A1 | | 8/2011 | |

OTHER PUBLICATIONS

"Water-based systems—Joncryl® non-film-forming emulsions," Benefits, built on each other, pp. 8-9, BASF (2009).*
"Joncryl® Acrylic Resins," Printing & Packaging resins & performance additives, pp. 4-5, BASF (2013).*
"Orotan™ 731 DP 100% Versatile Pigment Dispersant," datasheet, Dow Chemical/Rohm and Haas Company, Dec. 2007.*
International Search Report and Written Opinion for International Application No. PCT/EP2014/050359 (Inventors Czudaj et al., filing date Jan. 10, 2014), European Patent Office, The Netherlands, dated Apr. 1, 2014.
Joncryl 678®, "Joncryl 678®, A styrene-acrylic resin for use in water-based inks and overprint varnishes," accessed at http://tamtranco.com/UserFiles/File/Nhua%20cho%20son%20va%20Muc%20in/Nhua%20cho%20muc%20in/Joncryl%20678/TDS-Joncryl_678.pdf, accessed on Jul. 17, 2017, 4 pages.
Joncryl 89®, "Joncryl 89®, General Purpose Non Film Forming Styrene Acrylic Polymer Emulsion," accessed at http://www.xtgchem.cn/upload/20110629015309.pdf, accessed on Jul. 17, 2017, 4 pages.

* cited by examiner

VARNISH HAVING A MICROSTRUCTURE

The present invention relates to waterborne paint (i.e. varnish, lacquer or coating) compositions being applicable to substrates. Such substrates may be e.g. paper, paperboard and sheets or films. The produced printed products are generally labels, folded boxes, job printing (leaflets, promotion), and paperboard packaging (e.g. covering boxes, round boxes). Moreover the application relates to the use of waterborne paint compositions for the preparation of a paint film on a substrate, and substrates provided with a paint film.

BACKGROUND OF THE INVENTION

The use of water-based varnishes, lacquers or paint compositions, also called waterborne paints, have been proven for the preparation of printed products such as labels, job printing and folded boxes. When processing in integrated coaters or coating units of sheet fed offset printing machines, water-based paints have been successfully established since the late 70th as so-called overprint varnishes (OPV) for protection of oil-based printing ink.

The basic requirement for the applicability of a paint composition as overprint varnish is, that the paint composition coats the previously wet, oil-based printing ink, which has been applied on a substrate, and forms a protective film thereon.

A classical waterborne paint has generally one or more of the following functions:
  protection of the printing ink against abrasion;
  achievement of different gloss-levels from matte to high-gloss;
  achievement of different slip behaviors from dull to smooth; and
  sealing of the surface; the used paints are odorless and tasteless after drying.

Moreover it is desirable that further functions are met, such as anti-sealing against a packaging film, a temporary barrier against water or grease, or similar functions.

Finally, the water-borne paint compositions should also fulfill certain requirements in view of their processability. For instance, machine runability should be guaranteed, i.e., at usual printing rates of from 10 000 to 15 000 sheets/hr, and up to 18 000 sheets/hr during sheet fed offset printing, the paint has to be uniformly applied and dried to obtain a film. The throughput time through the dryer is usually significantly less than 0.5 seconds. The dryers are generally a combination of an IR radiator and a hot air blower. The temperature within the dryer is usually between 60 and 80° C., if possible at 80° C., and later in a stack at 30 to 40° C. When drying, at least parts of water and optionally other materials, such as e.g. ammonia, are deprived from the paint and the binder particles of the paint approach to such a level that a paint film develops. All these requirements should also apply to a new paint composition.

In order to be applied as a continuous overprint varnish film on a substrate, the waterborne paint composition has to wet the printed substrate, i.e., the printing ink, and otherwise also the substrate as such. On areas without printing ink, the paint has merely to form a continuous film on the substrate, for instance on a paperboard surface, i.e. a film formation takes place.

The water-based paint is wet-applied. e.g., with 3.5-5 g/m². With a solids content of the water-based paint composition of 30-45%, a dry film with about 1 to 2.25 g/m² remains on the substrate after drying, depending on the formulation of paint. Then the dry film has to develop an appropriate profile of characteristics, e.g. in order to ensure protection against abrasion. The dry film should also have a certain resistance against humidity and should not be dissolved too quickly under the influence of humidity or moisture and then probably tacks.

The reason is that during the printing process, moisture or humidity will be absorbed (in offset printing, the application of printing ink is controlled by damping water). When bonding any substrates with glue in a later process step, for instance in the production of folded boxes, the paint must not be dissolved again. Thus, humidity may play a role when filling or packing a bulk material, e.g. deep-frozen food, or during a transport at elevated temperatures at, e.g., 70° C., and at a corresponding relative humidity (transport in trucks through hot and humid countries).

Thus, the paint composition is usually selected in a manner so that the paint can form a film at common temperatures of from 60 to 80° C. in a dryer (in a time period of less than 0.5 seconds) and the paint film can later develop a barrier against water. That is, the minimum film (forming) temperature (MFT) of the used paints is generally less than 80° C., typically between 1° C. and 60° C.

In most cases, a conventional paint composition contains as the main component a polymer dispersion and often additionally a polymer resin. The polymer resin has been often neutralized with ammonia, and there are various types of resins having different acid numbers, molecular weight distributions, and glass transition temperatures, which might be used. Numerous different dispersions having various suitable glass transition temperatures ($T_G$) have been used.

The minimum film temperature of a standard paint is at +1° C. to +60° C., preferably at 30 to 50° C. In this range of MFT, a sufficient film formation will be achieved, while the paint forms a continuous film.

Due to the above mentioned profile of characteristics and applications, such paints are also designated as graphic overprint varnishes (overprint varnish, OPV). Moreover, apart from the mentioned conventional printing processes, water-based paint systems have sometimes also advantageously been used in digital printing, for instance in inkjet printing, both as overprint varnish and primer (base coat).

However, conventional waterborne paints have the disadvantage that printing on the paints by inkjet printing involves considerable difficulties. The paint film is formed in such a manner that when printing on the paint film with water-based inkjet inks, the water of the ink cannot be absorbed with a sufficient speed, and even water of the ink cannot evaporate with a sufficient speed so that a wet coverage of ink remains on the paint film. As a result often no adherence of the inkjet ink on the paint film is achieved within an adequate time period. Drying times of less than 0.3 seconds are required for industrial applications because after this process time, the inkjet print has to be resistant to mechanical forces. However, if the ink is not totally dry or has not been absorbed by the paint film when exposed to mechanical forces, the printed design or image may "blur" and can be altered beyond all recognition. Codes, such as bar-codes or QR-Codes, often become illegible or unreadable. Therefore such prints are applied on areas where previously the treatment with paint has been omitted. In this case, the ink is printed on a surface of the substrate being free of paint and can be absorbed. However, the omission of areas of the substrate's surface when applying paint involves additional efforts for the process.

Attempts have been made in the past for adapting a substrate, such as paper or paperboard, to inkjet printing. This can occur for instance already during the production by treatment of the paper- or paperboard materials by means of so-called sizing agents. As a result, a surface having porosity can be obtained which is conducive for inkjet printing. WO 2011/093896 A1 discloses e.g. a paper with a surface treatment for inkjet printing, wherein the paper has been treated with a sizing agent comprising non-film-forming polymer latex and a metal salt. However, on the one hand, a non-film-forming material has been used, making the application as an overprint varnish unsuitable, and, on the other hand, a quite high portion of from 40 to 60 wt.-% of a metal salt has been used, making the composition unsuitable for a use in direct contact with e.g. food or pharmaceuticals because the high portion of metal salt affects food and pharmaceuticals in their material composition and in their taste. In contact with humidity, such salts can be leached out. Due to their composition such formulations—from a technical point of view—are not applicable inside a coater in the offset printing process.

BRIEF DESCRIPTION OF THE SEVERAL VIEWS OF TI-IE DRAWINGS

DISCLOSURE OF THE INVENTION

Figure 1:
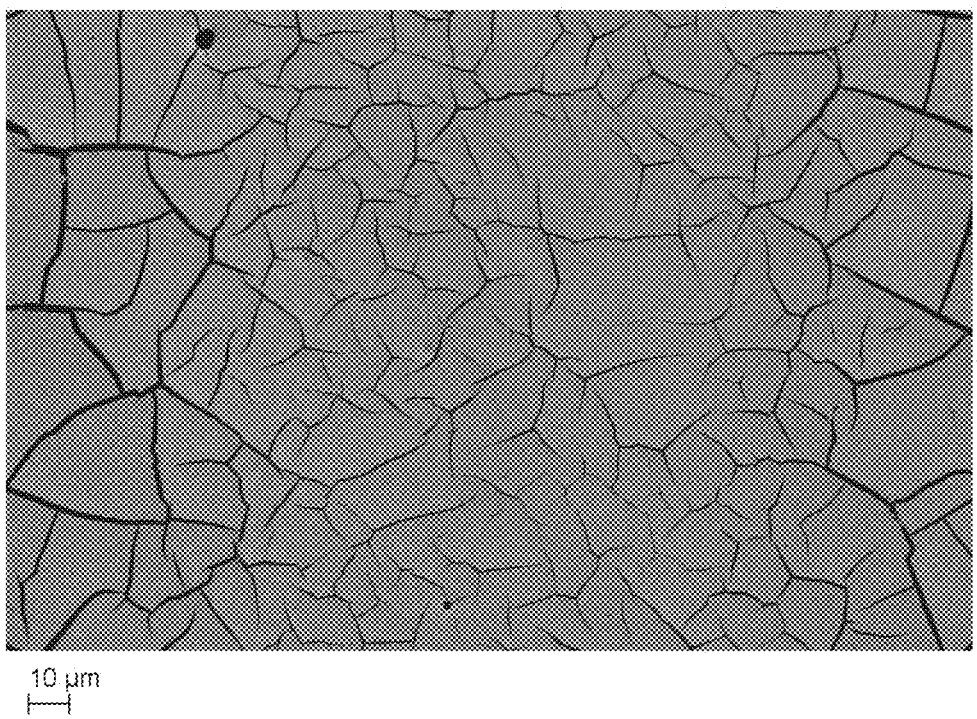
FIG. 1 depicts a photomicrograph of a paint film of the present invention (Example 1) in a 500-fold magnitude.

Therefore, there is a continuous demand for a paint composition, which is suitable as an overprint varnish in the application on printed substrates or as a primer, and which simultaneously allows for a further printing or overprint by inkjet printing in an industrial process and for the use in the packaging industry.

Thus, the object of the present invention is to overcome the above mentioned disadvantages and difficulties and to provide a waterborne paint composition which enables plane area painting and simultaneously has not the problems of conventional waterborne paints.

It has been surprisingly found that the object can be achieved by a waterborne paint composition according to claim 1.

Preferred embodiments have been defined in the dependent claims.

A first aspect of the present application relates to a waterborne paint composition, comprising:
 a non-film-forming poly(styrene acrylate) having a glass transition temperature ($T_G$) of at least 80° C.
 a poly(styrene acrylate) resin having a weight average molecular weight ($M_W$) of up to 20 000 g/mol, and water.

A further aspect of the present invention relates to the use of a paint composition according to the first aspect for the preparation of a microstructured paint film on a substrate.

The paint composition of the present invention comprises at least a non-film-forming poly(styrene acrylate) having a glass transition temperature ($T_G$) of at least 80° C., a poly(styrene acrylate) resin having a weight average molecular weight ($M_W$) of up to 20 000 g/mol, and water.

The basic idea of the invention is based on the provision of a paint composition, which—if applied on a substrate—results in a microstructured paint film after drying of the paint composition.

The paint film is structured in such a manner that numerous small cracks are formed. In a preferred embodiment, these cracks are at most 2 µm, more preferably at most 1 µm, in width. More preferably the cracks can have a width of from 0.5 to 1 µm. The length of the cracks is preferably of from 5 to 50 µm. If such a formed paint film is printed by a water-based ink, the cracks will be filled with ink and a major part of ink has "access" to the below substrate.

Without being bound to any theory, it is believed that these purposively generated cracks fulfill several functions. On the one hand, the cracks can conduct the applied ink to the surface of the substrate. At the surface of the substrate the ink can be absorbed into the substrate by capillary action. Moreover, further ink will be absorbed by the cracks themselves. By rapid embedding of the ink into a solid paint matrix—but not on the surface of a continuous paint film—a "dry" surface can be formed. The rapid evaporation of the ink's solvent, which is required in the conventional application on a continuous paint film surface, is no longer necessary. An additional advantage of the paint film as formed by the present paint composition is that the inkjet ink partially undercuts the paint film and, therefore, is protected by the paint film. As a result, a prompt influence of mechanical forces on the printed image is possible.

In order to generate a continuous paint film on the optionally printed surface of the substrate, the paint composition has to be a film forming paint composition. In a preferred embodiment, the minimum film temperature (MFT, also called minimum film forming temperature, MFFT) is at least 50° C. preferably at least 60° C., more preferably at least 65° C., and in particular the MFT is in the range of from 67° C. to 85° C.

The minimum film temperature (MFT) is the lowest temperature at which a thin layer of a resin dispersion just dries to from a continuous film. For the purpose of the present application, the MFT is determined by the so-called MFT-Bank according to DIN ISO 2155 (edition of April 2001).

A further important parameter of the used polymer dispersions, polymer resins, and the (dried) paint composition according to the present invention is the glass transition temperature ($T_G$). The glass transition or softening temperature ($T_G$) is the temperature, at which a substance (glass) has the highest alteration of the ability for deformation. For the purpose of the present application, the $T_6$ has been determined in accordance with DIN 51007 (edition of June 1994).

In the present invention the poly(styrene acrylate) resin is characterized by the weight average molecular weight ($M_W$). For the purpose of the present application, the weight average molecular weight ($M_W$) can be determined by gel permeation chromatography (GPC) according to ISO 16014-4 2003.

It is believed that the formation of cracks of the paint film is based on the ratio and type of the polymer resin and polymer dispersion, in particular on the used polymer dispersions and mixtures thereof.

In the paint composition according to the present application, a non-film-forming poly(styrene acrylate) is used. It is preferably a water-based dispersion of a non-film-forming poly(styrene acrylate). The poly(styrene acrylate)s used according to the present invention are formed by copolymerization or graft polymerization of styrene or α-methyl-styrene with acrylic acid or methacrylic acid and/or the respective esters, such as methyl or ethyl esters of acrylic acid. Styrene or α-methyl-styrene can be used alone or as a mixture. Likewise acrylic acid, methacrylic acid, and the respective ester can be used alone or as a mixture. Alternatively, or additionally to acrylic acid also maleic acid or maleic anhydride may be used. Such polymer dispersions can be produced by several polymerization processes (e.g., emulsion polymerization, suspension polymerization) directly from the monomers or also through the dispersion of polymers.

According to a preferred embodiment of the first aspect, the non-film-forming poly(styrene acrylate) has a glass transition temperature ($T_G$) of at least 80° C., preferably of at least 90° C., more preferably of at least 95° C., and in particular of at least 100° C.

A further essential component of the paint composition of the present invention is a poly(styrene acrylate) resin. Preferred is a resin having such a molecular weight $M_W$ that the resin, optionally after neutralization, for instance with a base such as ammonia, amines, KOH, NaOH, and similar bases, can be dissolved in water. The poly(styrene acrylate) resin can be prepared by a bulk polymerization from styrene and acrylic acid, and subsequently can be optionally neutralized. Apart from styrene also α-methyl-styrene with acrylic acid or methacrylic acid and the respective esters, such as methyl or ethyl esters of acrylic acid, can be polymerized to obtain a poly(styrene acrylate) resin. Styrene or α-methyl-styrene can be used alone or as a mixture. Likewise, acrylic acid, methacrylic acid and the respective esters can be used alone or as a mixture. Alternatively or additionally to acrylic acid, also maleic acid or maleic anhydride can be used. The poly(styrene acrylate) resin of the present invention, e.g., can have an acid number in the range of from 200 to 300, preferably of from 210 to 250. The acid number indicates the amount of potassium hydroxide in mg, being necessary in order to neutralize the free fatty acids contained in 1 g of poly(styrene acrylate) resin. The acid number is a measure of the number of carboxylic acid groups within the poly(styrene acrylate) resin.

In a preferred embodiment of the first aspect of the present invention, the poly(styrene acrylate) resin has a weight average molecular weight ($M_W$) of up to 10 000 g/mol, preferably of up to 5 000 g/mol, in particular of up to 2 000 g/mol.

According to another preferred embodiment of the first aspect, the poly(styrene acrylate) resin has a glass transition temperature (To) of at least 55° C.

The ratio of the two main components of the composition according to the invention is freely adjustable. According to a preferred embodiment of the first aspect, the ratio of non-film-forming poly(styrene acrylate) to poly(styrene acrylate) resin, each based on the weight of solids, is in the range of from 5:1 to 1:1, preferably in the range of from 4:1 to 1.2:1, more preferably in the range of from 3:1 to 1.5:1, and in particular, the ratio is about 3:1 or about 2:1.

Apart from both polymeric main components of a non-film-forming poly(styrene acrylate) and a poly(styrene acrylate) resin, the waterborne paint composition of the present invention can also contain a cross-linking agent, preferably an inorganic cross-linking agent. Preferably the cross-linking agent is added as a solution, for instance as an aqueous solution. The concentration of the cross-linking agent in the solution can preferably be in the range of from 10 to 50 wt.-%, more preferably in the range of from 15 to 30 wt.-%, in particular at about 20 wt.-%. The amount of cross-linking agent in the paint composition can preferably be in the range of from 0.1 to 5, more preferably in the range of from 0.5 to 2 wt.-%, each based on the total weight of the water-based paint composition.

In a preferred embodiment of the present invention, the cross-linking agent comprises ammonium zinc carbonate.

In another preferred embodiment of the present invention the paint composition according to the first aspect comprises a hydrophobic dispersing agent. In particular, the hydrophobic dispersing agent comprises the salt of a polycarboxylic acid, preferably an ammonium salt. The dispersing agent can preferably be used as a solution. The concentration of the dispersing agents in the solution is in the range of from 10 to 50 wt.-%, preferably in the range of from 15 to 30 wt.-%, in particular at about 20 wt.-%. The amount of the dispersing agent in the paint composition can preferably be in the range of from 0.1 to 5, more preferably in the range of from 2 to 3 wt.-%, each based on the total weight of the water-based paint composition.

The amount of further salts, such as inorganic salts, in particular inorganic metal salts, in the paint composition of the present invention is preferably less than 10 wt.-%, more preferably less than 5 wt.-%, and in particular less than 2 wt.-%, each based on the total weight of the water-based paint composition.

Moreover, the paint composition of the present invention can contain other usual additives. In a preferred embodiment of the present invention, the paint composition further comprises at least an additive selected from wax, surfactant or wetting agent, defoamer, base, retarder, and coalescing agent.

For instance, the minimum film temperature of a paint composition can be reduced by addition of coalescing agents, such as, e.g., glycol ether, or a surfactant or wetting agent. The abrasion resistance of the dried paint film can be influenced, e.g., by addition of a wax. Drying of the paint film in the unit can be influenced by retarders, such as glycerol.

The gloss of an applied paint film can be controlled by the addition of matting agents. Thus, in a preferred embodiment, the paint composition of the present invention comprises as a further component a matting agent, such as silica. The matting agent can be used in the paint composition preferably in an amount of up to 10 wt.-%, more preferably in the range of from 1 to 4 wt.-%, each based on the total weight of the water-based paint composition.

The level of matting can also be influenced by the addition of a polyurethane dispersion. Turbidity is developed on the surface of the paint. Preferably a polyurethane dispersion is used up to at most 20% (preferably up to 10%). As the polyurethane dispersion, for instance, Neorez® 1010 up to at most 20% (preferably up to 10%) can be used.

The waterborne paint composition of the present invention can be used as a graphic overprint varnish ("Overprint Varnish", OPV). However the paint compositions of the present invention can also be used as a primer (base coat) before applying a printing ink, whereby they basically can be used in very different printing techniques (flexo printing, gravure printing, roll-/sheet offset printing, and the like). Thus, the waterborne paint systems according to the present invention may also be advantageously used—apart from the mentioned conventional printing processes—in digital printing, for instance in inkjet printing processes, both as overprint varnish and also as a primer.

A preferred paint composition according to the first aspect of the present invention comprises:
- 45 to 65 wt.-% of the non-film-forming poly(styrene acrylate) having a glass transition temperature ($T_G$) of at least 100° C. (DSC) in the form of an aqueous dispersion,
- 8 to 12 wt.-% of the poly(styrene acrylate) resin having a weight average molecular weight ($M_W$) of up to 5 000 g/mol in the form of a neutralized solid,
- 5 to 7 wt.-% of the inorganic cross-linking agents in solution,
- 4 to 7 wt.-% of an emulsion of polyethylene wax with 32 wt.-% solids content,
- 1 to 3 wt.-% of glycerol,
- 0.1 to 2 wt.-% of a surfactant or wetting agent,
- 0.1 to 1 wt.-% of a silicone defoamer,
- ammonia, and
- water, wherein the percentages add to a total of 100 wt.-%.

A more preferable paint composition according to the first aspect of the present invention comprises:
- 45 to 65 wt.-% of the non-film-forming poly(styrene acrylate) having a glass transition temperature ($T_G$) of at least 100° C. (DSC) in the form of an aqueous dispersion,
- 8 to 12 wt.-% of the poly(styrene acrylate) resin having a weight average molecular weight ($M_W$) of up to 5 000 g/mol in the form of a neutralized solid,
- 8 to 14 wt.-%, preferably 10 to 14 wt.-% of a hydrophobic dispersing agent,
- 5 to 7 wt.-% of the inorganic cross-linking agents in solution,
- 4 to 7 wt.-% of a emulsion of polyethylene wax with 32 wt.-% solids content,
- 1 to 3 wt.-% of glycerol,
- 0.1 to 2 wt.-% of a surfactant or wetting agent,
- 0.1 to 1 wt.-% of a silicone defoamer,
- ammonia, and
- water, wherein the percentages add to a total of 100 wt.-%.

A second aspect of the present invention relates to the use of a paint composition according to the first aspect of the present invention for the preparation of a microstructured paint film on a substrate.

As a substrate, inter alia, paper, paperboard and card board, such as coated and non-coated or printed paper or card board, or sheets or films are suitable. Preferably, printed or unprinted paper or printed or unprinted paperboard is used as a substrate.

In particular, all materials for the manufacture of paperboard packaging and flexible packaging, all materials for the manufacture of job printing (leaflets, promotion), folded boxes, labels, bag or sack packaging, round boxes, covering boxes or secondary packaging, sleeves, decal labels, and composite and layer materials are suitable.

In a preferred embodiment of the second aspect, the microstructured paint film has numerous cracks having a width of at most 2 μm.

In another preferred embodiment of the second aspect, the paint composition is used as a primer (base coat) and/or overprint varnish on substrates such as paper or paperboard.

In particular, the non-film-forming dispersion has a $T_G$ of at least 80° C. This dispersion is modified by admixing other raw materials, so that the resulting MFT in the paint film is reduced in such a manner, that an approach of the polymers becomes basically possible, but that an even and total "coalescence" via a development of spatially separated "islands" is excluded to a significant amount by crack formation. By the modification a good flow behavior in the coater is ensured and the final minimum water resistance is guaranteed.

The paint composition of the present invention offers numerous advantages. If, for instance, the paint composition is applied on non-coated papers, in particular inkjet inks having an intensive color are rapidly absorbed. A type of "blotter effect" arises, and the printing ink bleeds through. However, if a coated paperboard is coated with a paint composition according to the invention and—after drying—is subsequently printed with solvent containing gravure printing inks having a low viscosity, the gloss is enhanced, e.g. from about 40 gloss points to 60 gloss points. The printing ink is maintained in the paint matrix and is abrasion resistant.

By the use of the paint composition according to the present invention, new application techniques will be developed. Thus, for instance, folded boxes may be painted over the full area with the paint composition according to the present invention and may subsequently be printed e.g. by gravure printing and may also be glued together without any problems. Due to the properties of the paint film, omissions for printing areas or glue areas are no longer necessary. The preparation and exchange of varnish printing plates is no longer necessary which results in savings of material and setup time in offset printing. The area for a print, for instance a code, may be selected freely at any time. It is not necessary, as is normally usual, to select an area for printing beforehand.

The paint composition according to the invention also allows for primers or base coats on substrates, whereby, for instance, by means of the above mentioned "blotter effect", safety signs, such as water marks, may subsequently be applied.

By the use of the paint composition according to the present invention as primer or base coat, surfaces of substrates may be improved in their quality, whereby the subsequent printing has a more brilliant appearance and is higher resistant to abrasion.

Thus, a paint being applied as primer already before the printing process is enabled to act as an OPV and to achieve the respective characteristics for the final product, although no further coating is applied after the application of the printing agent.

In the following, the present invention as described above is further illustrated by the accompanying examples.

Example 1

The following components have been stirred together in their respective amounts.

| component | amount (wt.-%) |
| --- | --- |
| Induprint SE 385 ex Indulor Chemie GmbH (non-film-forming dispersion, $T_G$ 107° C.) | 60 |
| Joncryl 678 ex BASF SE ($M_W$ about 8500 g/mol/acid number 216/$T_G$ 101° C.) | 10 |
| ammonia | 2.4 |
| ammonium zinc carbonate solution (20%) | 6 |
| Ultralube E 842 D (PE-wax emulsion, 32%) | 6 |
| Aerosol ® OT-85 AE ex Cytec (surfactant or wetting agent) | 1 |
| Glycerol (retarder) | 2.84 |
| BYK ® 019 ex Byk Chemie (silicone defoamer) | 0.34 |
| water | 11.42 |

Figure 2:
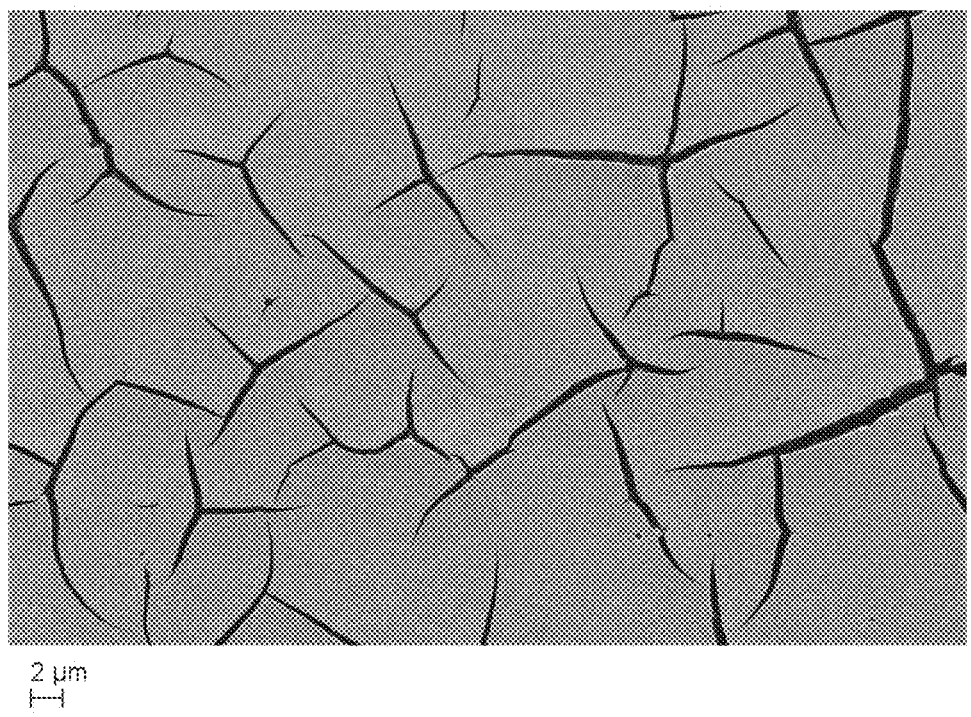
FIG. 2 depicts a photomicrograph of a paint film of the present invention (Example 1) in a 2,000-fold magnitude.

With the selected formulation, a dried paint film having a crack structure is obtained, as is also apparent from FIGS. 1 and 2. The above formulations could be processed in a coating unit without any problems.

FIGS. 1 and 2, respectively, depict a photomicrograph of a paint film of the present invention (Example 1) in a 500-fold (FIG. 1) and a 2 000-fold (FIG. 2) magnification. The formation of a crack structure on the surface is evident. The cracks have an average length of about 5 to 50 m and an average width in the range of from 0.5 to 1 µm.

Figure 3:
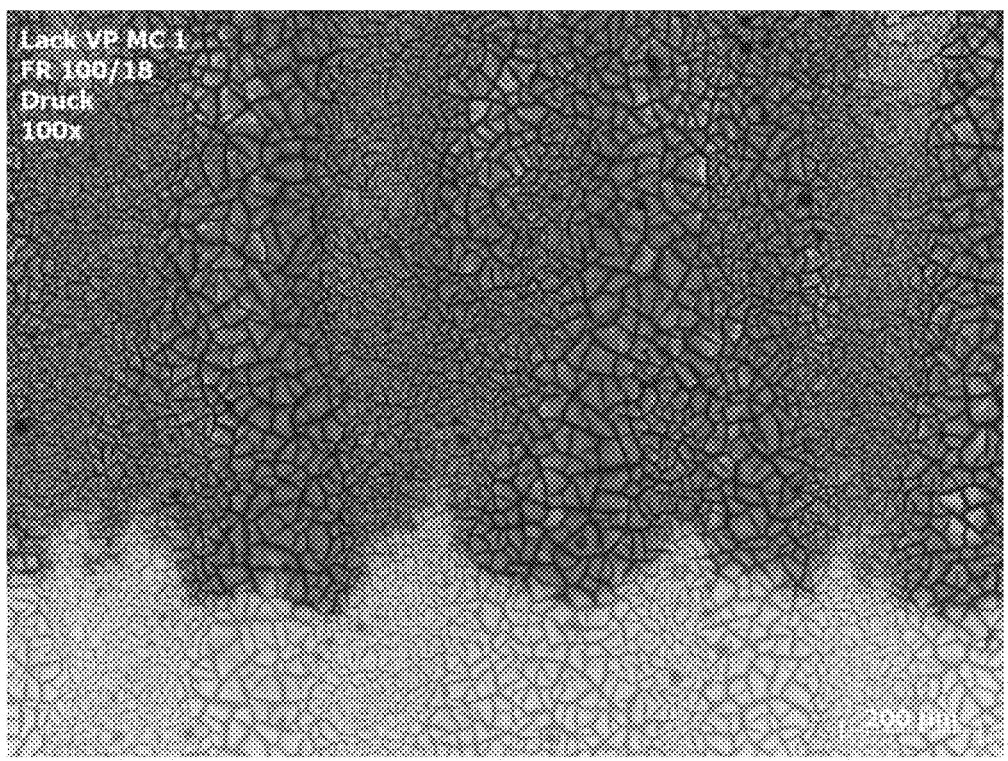
FIG. 3 illustrates that when printing on a paint film, prepared according to Example 1, the ink penetrates into the cracks and thus allows for a uniform inking of the surface.

FIG. 3 illustrates that when printing on a paint film, prepared according to above Example 1, the ink penetrates into the cracks and thus allows for a uniform inking of the surface.

Figure 4:
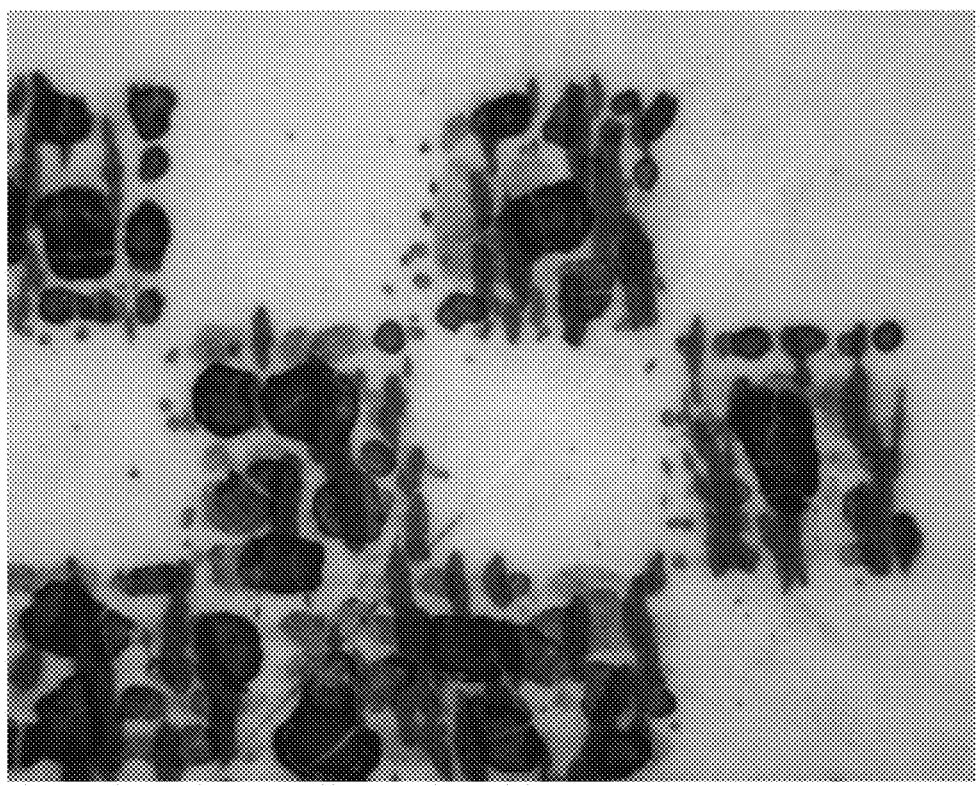
FIG. 4 depicts (90-fold magnitude) a section of a QR-Code, printed on a conventional overprint varnish by inkjet printing, wherein no uniform coverage of color on the surface is achieved.

This characteristic is further illustrated when compared to a conventional overprint varnish. FIG. 4 depicts (90-fold magnification) a section of a QR-Code, printed on a conventional overprint varnish by inkjet printing. As shown in FIG. 4, no uniform coverage of color on the surface is achieved. Rather, ink droplets have been formed on the paint film, which then dry in a non-uniform manner. Apart from a longer drying time on a conventional paint film also a non-uniform print arises.

Figure 5:
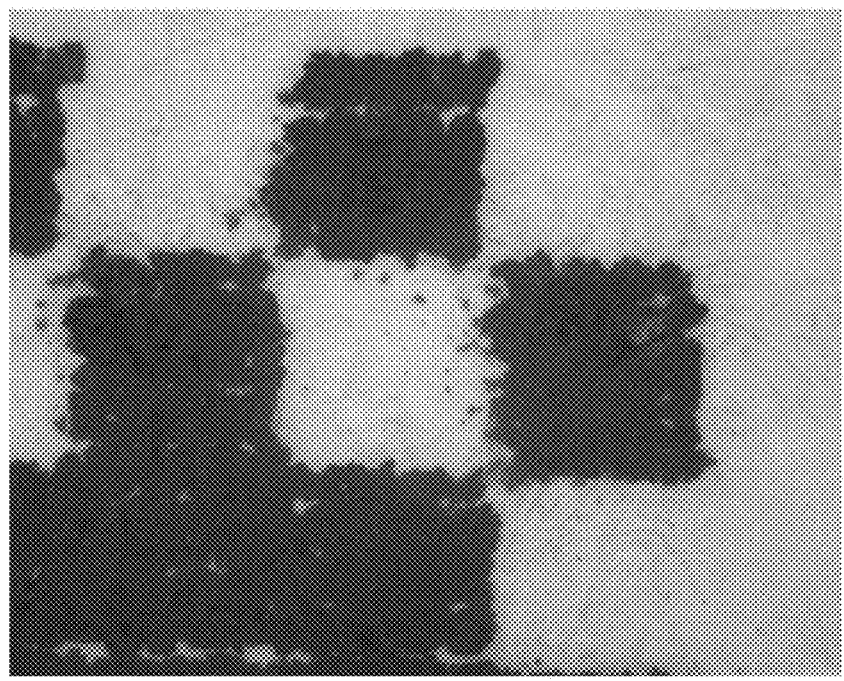
FIG. 5 depicts a section of a printing image of a QR code printed by inkjet printing on a paint film according to Example 1, showing uniform coverage of the surface with the inkjet ink and a better legibility of the printed QR code 15 image.

In contrast. FIG. 5 depicts the same section of a printing image of a QR code printed by inkjet printing on a paint film according to Example 1. The more uniform coverage of the surface with the inkjet ink allows for a better legibility of the printed image, and thus of the QR code. This results from the penetration of ink into the cracks on the surface of the paint film and from the penetration of the ink into the underlying substrate, provided that it is absorptive.

Example 2

The following components have been stirred together in the respective amounts.

| component | amount (wt.-%) |
| --- | --- |
| Induprint SE 385 ex Indulor Chemie GmbH (non-film-forming dispersion, $T_G$ 107° C.) | 47.0 |
| Indurez SR 10 ex Indulor Chemie GmbH ($M_W$ about 6.000-8.000 g/mol/acid number 215-230/$T_G$ 105° C.) | 8.0 |
| ammonia | 1.8 |
| ammonium zinc carbonate solution (20% ig) | 5.0 |
| Orotan ® 731 AER ex Rohm & Haas (hydrophobic dispersant) | 11.0 |
| Aquacer ® 3RC 7999 ex Byk Cera (PE-wax emulsion, 32%) | 5.0 |
| Aerosol ® OT-85 AE ex Cytec (surfactant or wetting agent) | 1.0 |
| Glycerol (retarder) | 2.5 |
| BYK ® 019 ex Byk Chemie (silicone defoamer) | 0.3 |
| water | 18.4 |

With the selected formulation, a dried paint film having a crack structure is obtained, similar to that in FIGS. 1 and 2. The above formulation could be processed in a coating unit without any problems and has subsequently been inkjet-printed in accordance with Example 1.

Example 3

The following components have been stirred together in their respective amounts.

| component | amount (wt.-%) |
| --- | --- |
| Induprint SE 385 ex Indulor Chemie GmbH (non-film-foaming dispersion, $T_G$ 107° C.) | 53.0 |
| Indurez SR 10 ex Indulor Chemie GmbH ($M_W$ about 6.000-8.000 g/mol/acid number 215-230/$T_G$ 105° C.) | 8.0 |
| ammonia | 2.0 |
| ammonium zinc carbonate solution (20%) | 6.0 |
| Aquacer ® 3RC 7999 ex Byk Cera (PE-wax emulsion, 32%) | 6.0 |
| Aerosol ® OT-85 AE ex Cytec (surfactant or wetting agent) | 1.0 |
| Glycerol (retarder) | 2.8 |
| BYK ® 019 ex Byk Chemie (silicone defoamer) | 0.3 |
| water | 20.9 |

With the selected formulation, a dried paint film having a crack structure is obtained, similar to that in FIGS. 1 and 2. The above formulation could be processed in a coating unit without any problems and has subsequently been inkjet-printed in accordance with Example 1.

Example 4

The following components have been stirred together in their respective amounts.

| component | amount (wt.-%) |
| --- | --- |
| Induprint SE 371 ex Indulor Chemie GmbH (non-film-forming dispersion, $T_G$ 101° C.) | 60 |
| Indurez SR 30 ex Indulor Chemie GmbH ($M_W$ about 2.500-3.500 g/mol/acid number 240-260/$T_G$ 72° C.) | 8 |
| ammonia | 1.8 |
| ammonium zinc carbonate solution (20%) | 5.0 |
| Orotan ® 731 AER ex Rohm&Haas (hydrophobic dispersant) | 8.0 |
| Aquacer ® 3RC 7999 ex Byk Cera (PE-wax emulsion, 32%) | 5.0 |
| Aerosol ® OT-85 AE ex Cytec (surfactant or wetting agent) | 1.0 |
| Glycerol (retarder) | 1.0 |
| BYK ® 019 ex Byk Chemie (silicone defoamer) | 0.3 |
| water | 9.9 |

With the selected formulation, a dried paint film having a crack structure is obtained, similar to that in FIGS. 1 and 2. The above formulation could be processed in a coating unit without any problems and has subsequently been inkjet-printed in accordance with Example 1.

The invention claimed is:

1. A waterborne paint composition, comprising:
    45 to 65 wt.-% of a non-film-forming poly(styrene acrylate) having a glass transition temperature ($T_G$) of at least 100° C. in the form of an aqueous dispersion,
    8 to 12 wt.-% of a polystyrene acrylate) resin having a weight average molecular weight ($M_W$) of up to 5 000 g/mol in the form of a neutralized solid,
    10-14 wt.-% of a hydrophobic dispersing agent,
    5 to 7 wt.-% of an inorganic cross-linking agent in solution,
    4 to 7% wt-% of an emulsion of polyethylene wax having an amount of 32 wt.-% solids content,
    1 to 3 wt.-% of glycerol, 0.1 to 2 wt.-% of surfactant or wetting agent,
0.1 to 1 wt.-% of a silicone defoamer,
ammonia, and
water,
wherein the percentages add to a total of 100 wt.-%.

2. The waterborne paint composition of claim 1,
wherein the ratio of non-film-forming poly(styrene acrylate) to poly(styrene acrylate) resin, each based on the weight of solids, is in the range of from 4:1 to 1.2:1, and
wherein when said paint composition is applied to a substrate, a microstructured paint film is formed on said substrate.

3. The waterborne paint composition according to claim 2, wherein the microstructured paint film has numerous cracks having a width of at most 2 µm.

4. The waterborne paint composition according to claim 1, wherein the ratio of the non-film-forming poly(styrene acrylate) to the poly(styrene acrylate) resin, each based on the weight of solids, is in the range of from 3:1 to 1.5:1.

5. The waterborne paint composition according to claim 1, wherein the ratio of the non-film-forming poly(styrene acrylate) to the poly(styrene acrylate) resin, each based on the weight of solids, is about 2:1.

6. The waterborne paint composition according to claim 1, wherein the poly(styrene acrylate) resin has a weight average molecular weight ($M_w$) of up to 2 000 g/mol.

7. The waterborne paint composition according to claim 1, wherein the poly(styrene acrylate) resin has a glass transition temperature ($T_G$) of at least 55° C.

8. The waterborne paint composition according to claim 1, wherein the poly(styrene acrylate) resin has an acid number of from 200 to 300.

9. The waterborne paint composition according to claim 1, wherein the hydrophobic dispersing agent comprises a salt of a polycarboxylic acid.

10. The waterborne paint composition according to claim 9, wherein the hydrophobic dispersing agent comprises an ammonium salt of a polycarboxylic acid.

11. The waterborne paint composition according to claim 1, wherein the inorganic cross-linking agent comprises ammonium zinc carbonate.

12. The waterborne paint composition according to claim 1, having a minimum film forming temperature of at least 50° C.

13. A method of preparing a microstructured paint film on a substrate, comprising applying the waterborne paint composition according to claim 1 to said substrate.

14. The method of claim 13, wherein the microstructured paint film has numerous cracks having a width of at most 2 µm.

15. The method of claim 13 wherein said waterborne composition is applied as a primer and/or overprint varnish to a substrate selected from the group consisting of paper, cardboard, paperboard, and sheet.

16. The method according to claim 13, further comprising printing with a solvent containing gravure printing ink on the microstructured paint film, thereby obtaining a coated substrate.

17. The method according to claim 16, wherein the coated substrate has a gloss of from 40 gloss points to 60 gloss points.

* * * * *